April 19, 1966        K. E. BAUER        3,246,838
CONTROLS FOR INFRARED EMITTERS
Filed July 20, 1964        2 Sheets-Sheet 1
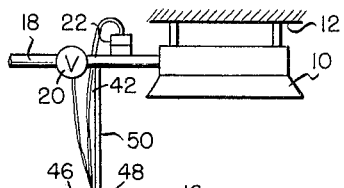
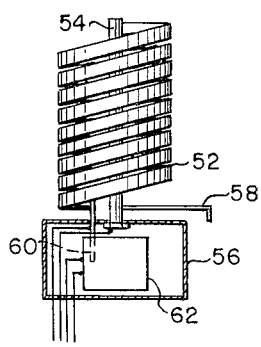
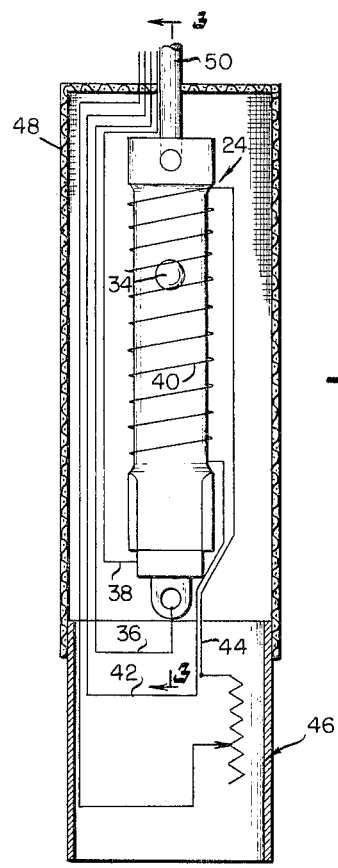
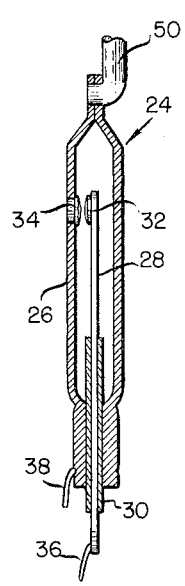
INVENTOR
Konrad E Bauer
BY *Strauch, Nolan & Neale*
ATTORNEYS April 19, 1966   K. E. BAUER   3,246,838
CONTROLS FOR INFRARED EMITTERS
Filed July 20, 1964                               2 Sheets-Sheet 2
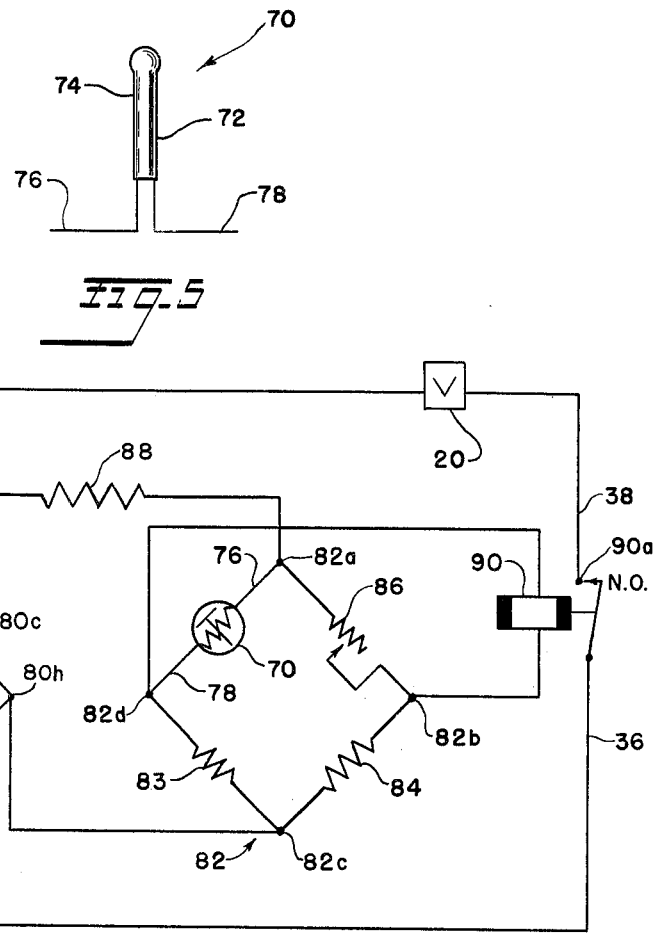
INVENTOR
*KONRAD E. BAUER*
BY *Strauch, Nolan & Neale*
ATTORNEYS United States Patent Office 3,246,838
Patented Apr. 19, 1966

3,246,838
CONTROLS FOR INFRARED EMITTERS
Konrad E. Bauer, Mentor, Ohio, assignor to Hupp Corporation, Cleveland, Ohio, a corporation of Virginia
Filed July 20, 1964, Ser. No. 384,578
5 Claims. (Cl. 236—36)

This application is a continuation-in-part of my application, Serial No. 55,298, filed September 12, 1960, and now abandoned.

This invention relates to automatic controls for emitters of infrared energy for comfort heating of occupants of a space subjected to infrared emission from such emitters, which normally supply radiation within the range of one to thirty microns wave length and are usually energized by combustion of fuel such as gas or by passage of an electric current through a resistance element.

Such infrared emitters are in widespread use in many industrial, commercial and domestic applications and are used principally where the characteristics of heating objects upon which the infrared energy is directed rather than the surrounding air is especially advantageous. For example, such heaters are advantageously used in large factories, or shops, or in exposed areas such as shipping docks to provide heat for individual workers. However, the characteristics of the heaters in heating the objects toward which they are directed rather than the surrounding air, which makes them ideally suited for installations where conventional space heaters are unsatisfactory, also renders it impossible to control the heaters properly by conventional thermostats which are sensitive only to ambient air temperature.

Prior attempts to provide suitable controls for such heaters have been unsuccessful, and while controls actuated by infrared radiation have been proposed heretofore, infrared heating installations are still generally controlled either by manually operated switches or by conventional thermostats with unsatisfactory results.

Controls have been designed to sense radiant energy striking the surface of a thermostatic element in addition to sensing the temperature of the air in which the element is located, but since such controls generally are not also responsive to the cooling effects of air currents, they still do not provide confortable thermal conditions at all times for occupants of the space in which the control is located. This is particularly true when the space is exposed as on a shipping dock.

An example of a control responsive to ambient temperature and to infrared radiation but not responsive to the cooling effect of air in motion is the control shown in Patent No. 2,835,779 to Kazan, which incorporates a heat-conducting plate having a blackened external surface, the plate being in thermal contact with a control thermostat. The plate and thermostat are housed in a box made of material transparent to infrared radiation. The control thermostat is responsive to infrared radiation transferred to or from the blackened surface as well as to heat conducted through the walls of the box to or from the adjacent air.

In one form of Kazan's invention, the blackened plate is heated by a resistance coil to the temperature of the human body, a second thermostat being provided to regulate the current to the resistance coil. Thus heat losses to adjacent air and radiation losses from the plate will simulate such losses from the bodies of persons in the controlled space, but the unit is essentially insensitive to heat loss or gain caused by air movement.

This prior control and similar controls are costly to build, since they incorporate two thermostats and a housing of material transparent to infrared radiation, such as quartz or quartz glass which are expensive materials.

Thermostatic controls for heating devices such as emitters of infrared radiation have also been proposed, incorporating a sensing element having a surface of high emissivity which is maintained by a combination of heat supplied by an adjacent heating coil and heat received from the infrared heating devices at a predetermined temperature approximating the surface temperature of an occupant of the space heated by the heating devices when the occupant is comfortable, and a thermostat which automatically increases the output of the infrared heating devices when the temperature of the sensing element falls below the predetermined temperature.

An example of such a control is shown in patent to G. M. White No. 3,062,941 which discloses a control for radiant heaters used for warming chicks in a brooder. This prior control employs as a sensing element a hollow sphere having a blackened exterior surface. Within the sphere are a heating coil supplying a predetermined amount of heat to the sphere and a thermistor (which is a temperature sensitive resistor having a high negative coefficient of resitivity), which acts through a bridge circuit, transistors and relays to cause the infrared heaters to emit infrared radiation whenever the temperature of the thermistor falls below a predetermined value. The thermistor temperature follows generally the temperature of the sphere.

A control of this type, which is complicated and expensive to produce, includes an arrangement of the parts within the sphere which tends to make the sphere heat unevenly, preventing accurate heat control and the spherical shell causes the control to lag behind the operation of the emitters, resulting in over-runs of the heat supply and delay in providing heat when it is required.

The present invention overcomes these defects in prior control devices. It recognizes that the human body is itself a producer of heat, that this heat is dissipated from the surface of skin or clothing at such a rate that body temperature is maintained within limits with a skin temperature of about 85° F. and that whenever heat losses from the body become excessive, external heat must be supplied from a heating device, more clothing must be used to cut down the heat loss or the person will feel cold, and that the body heat losses comprise radiation losses to colder surrounding objects and convection losses to surrounding air, the convection losses depending not only on the ambient air temperature, but on the rate of movement of the air over the body of the person.

The control provided by the present invention simulates the heat output of the body of an occupant of the heated space, is similarly cooled by radiation and convection, is exposed to the same air movement, is heated in the same manner by radiation from the infra-red heater, and immediately automatically adjusts the emission of infrared radiation to compensate for excess heat loss from the occupant's body.

If $a$ is the heat loss per unit time for the occupant's body under normal conditions of occupancy, $b$ is the area of the occupant's body, $c$ is the heat input to the control and $d$ is the area of the surface of the control, the $a/b$ equals the body heat loss per unit area. If the control unit functions so that $c/d$ equals $a/b$, the control will emit the same heat per unit area as the occupant's body. Therefore the input $c$ to be supplied to the control will equal $ad/b$ which can be expressed as watts input required if the control is electrically heated, for a control having a specified surface area.

It is evident that if comfortable thermal conditions exist in the space, the heat loss equals the heat gain and the temperature of the control remains constant.

If heat losses from the body of the occupant and from the surface of the control are greater than the heat generated by the occupant's body and the heat input to the control, respectively, the occupant will be cold and the temperature of the control thermostat will drop, causing the thermostat to actuate the infrared heater to provide at once more radiation until the thermostat temperature rises due to the increased level of radiant energy striking its surface whereupon the control reduces the output of the heater.

Means to provide prompt actuation of the heater control when the occupant's body temperature starts to change from that at which the person is comfortable is an essential element of the present invention and is not present in prior infrared controls.

It is known that the normal surface temperature of the human body is roughly 85° F. Body heat is normally disposed of 50% by radiation, 40% by convection and 10% by evaporation from the skin surface, but under drafty or windy conditions, these proportions will change. If any other physical body, the surface of which has as high emissivity as the human body, is provided with a heat source which tends to maintain it at a norm of approximately 85° F.–90° F. it would also tend to dissipate heat by radiation and by convection in the same manner as a human body. Thus, in accordance with the present invention, the thermostatic element is provided with a heater for artificially raising the temperature of the surface of the element to approximately the same temperature as the optimum temperature prevailing at the surface of the human body under ideal conditions and positioning it in the same relation to the infrared source as it is expected a person will occupy. It is further positioned and arranged so that it is otherwise exposed to the same environmental conditions to which the person sharing the infrared radiant source with the thermostat is exposed.

It is the principal purpose and object of the present invention to provide improved controls for infrared heaters which automatically regulate the operation of the heaters in accordance with the needs and comfort of the person or persons which the heater serves. It is a further object of the invention to provide improved automatic controls for infrared heaters which regulate the heater output radiation to balance the heat losses in excess of normal from the bodies of persons to be kept warm by the heater.

A further object of the present invention is to provide improved automatic thermostatic controls for infrared heaters which incorporate means for artificially simulating in the immediate vicinity of the thermostat essentially the same conditions as those which prevail at the surface of the human body.

It is a more specific object of the invention to provide controls for heating equipment, of the type heating by emission of infrared radiation which directly warms the occupants of a space, said controls responding to heat losses proportional to losses from the bodies of said occupants, resulting from contact with low temperature air, transfer of heat by air movement, and/or radiation to surrounding objects which are at lower temperatures than the surfaces of the occupant's bodies, thus causing the heating equipment to supply sufficient heat to balance the heat losses, said controls being accurate, reliable, simple, compact, quickly responsive to changing conditions and inexpensive to produce.

A still more specific object of the invention is to provide controls for infrared heaters to provide comfortable thermal conditions for occupants of the space to which heat is supplied by said heaters, the control incorporating a heat transfer member having a surface of high emissivity, said surface being directly exposed to air in the space and to radiation from said heaters, and having a configuration approximating, to any desired scale, the shape of the occupant of the space, control heating means supplying to the heat transfer member an amount of heat sufficient when no heat is being supplied by the infrared emitter to maintain the surface of the heat transfer member at the mean optimum temperature of the outer surface of the body of the occupant when the occupant is engaged in activity normally carried on in the space, and is comfortable, a thermally actuated control for controlling the operation of the infrared emitter responsive to the temperature of the heat transfer member and causing an increase in the emission thereof as soon as the temperature of the surface of the heater transfer member is below the aforesaid means optimum body temperature, and for causing a reduction in the emission when the emitter is in operation as soon as the temperature of the surface of the heat transfer member is above said optimum temperature, the control heating means and the thermally actuated control being in intimate heat exchange relation with the heat transfer member, so that the output of the emitter will be changed promptly when the temperature of the surface of the heat transfer member changes.

In some forms of the invention, the heat transfer member, the control heating means and the thermally actuated control are individual units. For example, the heat transfer member may be a copper tube with its external surface blackened, the control heating means may be a coil of resistance wire wound around the tube and the thermally actuated control may be a bimetal switch located within the copper tube and in thermal contact therewith.

In other forms of the invention, a single entity may combine the functions of heat transfer member, control heating means and thermally actuated control. For example, a bimetal coil having a blackened surface and made of thermally conducting material of high electrical resistance, which is in circuit with a source of current, closes a circuit to the infrared heater control when the bimetal coil is below the desired temperature of the surface of the occupant's body.

As another example, a thermistor having a blackened surface may be heated by current flowing through the thermistor, the amount of current flowing therethrough changing as the resistance of the thermistor decreases with rise in temperature and the resulting change in resistance acting through a bridge circuit to control the infrared emitters.

While the control of the present invention is primarily intended for use in conjunction with infrared heating apparatus for comfort heating of persons, and is so described, it is equally applicable for use in providing healthful or comfortable thermal environment for animals from sources of infrared emission.

Additional objects and advantages of the invention will become apparent as the description proceeds in connection with the accompanying drawings in which:

FIGURE 1 is an illustration of a typical application of the present invention showing the relation of the thermostat, the infrared heater and the person which the heater serves;

FIGURE 2 is an enlarged fragmentary elevation of one form of the thermostat;

FIGURE 3 is a vertical section taken along line 3—3 of FIGURE 2;

FIGURE 4 is a side elevation of another embodiment of the thermostat;

FIGURE 5 is a side elevation of still another embodiment of the thermostat; and

FIGURE 6 is a diagram of the control circuit in which the thermostat shown in FIGURE 5 is incorporated.

Referring now more particularly to the drawings, the invention is illustrated in FIGURE 1 as applied to the control of gas burning infrared generator 10 which is suspended from the ceiling 12 of a factory room or shop above a work table 14 and the worker 16. In a typical case a room or shop is unheated except for the infrared unit 10.

While the gas-burning infrared generator 10 per se forms no part of the present invention and may take a number of forms, it may be of the type shown in United States Patents 2,775,294 and 2,870,830 to which further reference may be made for details of a burner particularly suited for use with the invention.

Gas is supplied to the burner through an inlet conduit 18, the flow of gas being controlled by a solenoid valve 20. It is contemplated that the operation of the burner 10 will be fully automatic, i.e., upon the closing of the thermostatic circuit the burner will be ignited automatically. For this purpose the burner is preferably provided with a pilot and associated controls including a flame detector switch, transformer, etc. enclosed in a suitable housing 22. In a typical case the units and the circuit within the housing 22 may take the form shown in United States Patent 3,108,630 to which reference may be made for further details.

One embodiment of the novel thermosensitive device which forms one of the principal features of the present invention will now be described in detail with particular reference to FIGURES 2 and 3. The thermostat per se indicated generally at 24 comprises an elongated copper casing 26 which forms a heat transfer member and which is closed at one end.

At its opposite end it is provided with an opening through which a bi-metallic spring element 28 extends. The bi-metallic element 28 is electrically insulated from the housing 26 by a sleeve of silicone-impregnated Fiberglas insulation 30. The free end of the bi-metallic element 28 is provided with a contact point 32 opposite a contact point 34 mounted on the wall of the case 26. The bi-metallic element 28 and the casing 26 are connected by respective leads 36 and 38 to a circuit including a suitable power source (not shown) and the solenoid of valve 22. Conveniently, the circuit may be arranged in the same manner as that shown in aforesaid Patent 3,108,630.

By this arrangement the power circuit through the solenoid for the valve 20 is open when the contacts 32 and 34 are open and conversely the valve 20 is opened and the entire burner circuit is energized when the contacts 32 and 34 are closed.

The burner thus will be completely on or completely off which is the usual type of control, but by providing a restricted gas passage (not shown) around valve 20 the burner will operate automatically between full heat and reduced heat, with an additional manual valve (not shown) in line 18 to turn it off completely.

The bi-metallic element 28 is carefully calibrated so that the contacts 32 and 34 will remain open above a predetermined temperature and will close below that temperature. In accordance with the present invention the thermostat is so calibrated that the contacts will be closed at a temperature below about 88° F. and will open at about 90° F. As noted above, this temperature approximates the normal or desired body surface temperature of a human being. In accordance with the present invention, means are provided to maintain the body of the thermostat approximately at the critical temperature when environment conditions are such that artificial heat is not required for comfort, since, when the thermostat is in use, it will be located in an area where the temperature of the ambient air to which it would normally be sensitive is well below the critical temperature and may be as low as 50°F.

The control heating means comprises an electrically insulated heating coil 40 wrapped around the heat transfer member 26. One side of the heating coil is connected through a lead 42 to a transformer (not shown) or other suitable source of low voltage power and the other lead 44 is connected through a rheostat 46 to the power source. Rheostat 46 provides a measure of control to permit the regulation of the system to accommodate the preferences of individual users or the activity carried on in the heated area.

The thermostat 24 may be enclosed in a coarse mesh protective screen 48 which protects the thermostat against mechanical damage but permits the free circulation of air around the thermostat and the subsantially unimpeded transmission of radiant energy to and from the surface of heat transfer member 26, which in order to provide maximum emissivity is painted a flat black.

The entire thermostat assembly is mounted in close proximity to the space in which the person served by the heater is normally positioned. Conveniently the thermostat assembly is suspended by a cord or chain 50 from the heater 10 or alternately it may be mounted on a stand to permit movement as desired.

Another form of thermostat unit is illustrated in FIGURE 4 to which detailed reference will now be made. In this form of the invention the temperature sensitive element comprises a helically coiled bi-metal strip 52 preferably painted a flat black. Bi-metal strip 52 is composed of two layers having different coefficients of expansion and high electrical resistance. Alternately an electric resistor can be attached to the bi-metal strip, being in heat transfer relation thereto and electrically insulated thereform.

The upper end of strip 52 is rigidly secured to a fixed central post 54 supported on a housing 56. If desired, post 54 may be provided with a handle 58 by which its rotated position may be adjusted for initial calibration or a change of setting.

The free end of strip 52 carries an arm 60 operatively associated with a mercury or snap switch 62 mounted in housing 56. In this form of the invention bi-metal strip 52 serves a triple purpose, being a temperature actuated control means for switch 62, a control heating means in which current passing from lead 36 to lead 38 through the strip generates heat due to the electrical resistance of the bi-metal coil, and a heat transfer means, transferring heat absorbed on its surface to the interior of the bi-metal layers or transferring heat from the bi-metal to its surface where it is carried away by convection and radiation.

The flow of current through strip 52 is adjusted to provide a normal surface temperature in the range of 85° F. to 90° F. during a period when the occupant is comfortable without operation of the heater. Switch 62 is connected to the heater control apparatus through leads 36 and 38 in the same manner as the unit of FIGURES 1–3, is supported or suspended in the same relation to the heater 10 and its operation is essentially the same.

Still another form of thermostatic control is illustrated in FIGURES 5 and 6. The thermostat shown in FIGURE 5 is a thermistor 70 of conventional type having an elongated body 72 about one-half inch long and one-tenth inch in diameter. Its external surface 74 is painted flat black. It is connected in the circuit shown in FIGURE 6 by the leads 76 and 78.

The circuit incorporates a silicon rectifier 80 composed of four diodes 80a, 80b, 80c and 80d, connected through terminal 80e (between diodes 80a and 80c) to line L1 and through terminal 80f (between diodes 80b and 80d) to line L2 of a 115-volt power supply. The rectifier 80 is energized by the 115 volt supply to provide a source of direct current which will flow through a line connecting terminals 80g and 80h. Any other source of D.C. energy such as a battery might be substituted for rectifier 80.

A bridge circuit 82 which includes two fixed resistors 83 and 84, a variable resistance 86 and thermistor 70 has a terminal 82a between thermistor 70 and variable resistance 86, a terminal 82b between variable resistance 86 and resistor 84, a terminal 82c between resistor 83 and resistor 84 and a terminal 82d between thermistor 70 and resistor 83. Resistors 83 and 84 have equal resistance.

Terminal 82a is connected through a dropping resistor 88 to positive terminal 80g between diodes 80a and 80b. Terminal 82c is connected to negative terminal 80h between diodes 80c and 80d.

Terminal 82d is connected to terminal 82b through a relay coil 90 which when energized closes its normally open contact 90a, which is in the control circuit through lines 36 and 38 and valve 20, so that when contact 90a is closed, valve 20 will be energized and will open, causing the infrared generator 10 to operate.

Current through the bridge circuit is adjusted by adjustable resistance 86 so that terminals 82b and 82d are at the same potential when the surface of the thermistor is at a predetermined temperature normally between 85° F. and 90° F., with the heater 10 not in operation, under atmospheric conditions at which the worker would be comfortable.

If atmospheric conditions change so that the worker would be cold, the temperature of the thermistor will drop, its resistance will increase, the current flowing through it will decrease and this will cause it to cool further. The increased resistance would also unbalance the bridge, causing current to flow through relay coil 90, closing contacts 90a. With contacts 90a closed, current will flow through valve 20, causing it to open, whereupon heater 10 will operate, emitting infrared radiation which will warm the worker and increase the temperature of thermistor 70 until the bridge circuit is again balanced.

Because of its unique construction and its position, the thermostatic assembly provided in any of the three modifications is subject to substantially the same heat gain or loss as the adjacent person. Since the surface of the thermostatic element and the human body are normally maintained at approxiamtely the same temperature, all of the environmental conditions will have substantially the same effect on the thermostatic assembly and the adjacent person. Thus, in operation, if the environmental conditions are such that a person in the region of the thermostatic assembly will be comfortable, the switch contacts will remain open and the heater will remain out of operation. Conversely, when any change, such as the circulation of a cold air current, a drop in the ambient air temperature or increased radiation losses to cold walls or other factors which would upset the conditions of comfort occurs, heat losses from the surface of the control will also increase, dropping the temperature of the thermostat and causing the thermostat switch contacts to close, thus placing heater 10 in operation. When the heater is operating, the thermostat will absorb the radiant energy at substantially the same rate as the adjacent person since the rate of absorption of infrared energy depends principally upon the temperature and emissivity of the absorbing surface and its distance from the radiating source, its shape and orientation.

When the thermostatic units are employed to control an electrical infrared generator, the leads 36 and 38 are connected in series with the generator or are connected to control a solenoid switch which in turn is in series with the generator. In each of the three forms of the invention, an infrared emitter for warming the occupant of a space subjected to radiation from the emitter is controlled by a temperature actuated control means which is in intimate thermal contact with a heat transfer means, the heat transfer means being also in intimate thermal contact with a control heating means and having a surface of high emissivity positioned adjacent to an occupant of the space, the control heating means maintaining the surface at a temperature approximating the surface temperature of the occupant.

Thus the present invention provides for the first time in the art a control for infrared generators which is truly sensitive to all of the conditions upon which human comfort depends and thus substantially extends the utility and desirability and range of application of infrared heaters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A regulator for an infrared emitter which warms an occupant of a space by providing infrared radiation which impinges on his body, said regulator including a switch and a temperature sensitive control element for said switch, said regulator controlling said emitter to vary the emission of infrared radiation therefrom in response to changes in the temperature of said control element, heat transfer means in intimate heat exchange relation with said control element, said heat transfer means having a surface of high emissivity located in said space adjacent to said occupant and directly exposed to the same thermal environment as said occupant, and control heating means in intimate heat exchange relation to said heat transfer means and supplying heat thereto at a rate which will maintain said surface at a predetermined temperature which approximates the surface temperature of said occupant when said occupant is within said space and is comfortable.

2. A regulator as defined in claim 1, wherein said surface is shaped to simulate the outline shape of said occupant and is oriented in the position normally assumed by said occupant when within said space.

3. A regulator as defined in claim 1, wherein said control heating means is an electric resistor through which current flows.

4. A regulator as defined in claim 3 together with means for controlling the current flow through said resistor to regulate the temperature of said surface.

5. A regulator as defined in claim 1, in which said switch closes an electric circuit when said surface is below said predetermined temperature, said circuit when closed energizing said emitter.

References Cited by the Examiner

UNITED STATES PATENTS

| | | | |
|---|---|---|---|
| 1,186,024 | 6/1916 | Mulvany | 119—37 |
| 1,406,164 | 2/1922 | Anderson | 119—37 |
| 1,641,170 | 9/1927 | Karlson | 200—138.1 |
| 1,969,955 | 8/1934 | Thomas | 200—138.6 |
| 2,068,569 | 1/1937 | Rog | 200—113.8 |
| 2,093,648 | 9/1937 | Rice | 119—37 |
| 2,129,477 | 9/1938 | Parks | 200—122 |
| 2,152,934 | 4/1939 | Trent | 219—34 |
| 2,835,779 | 5/1958 | Kazan | 200—122 |
| 2,866,042 | 12/1958 | Schwing | 200—113.6 |
| 2,914,647 | 11/1959 | Ganske et al. | 219—34.13 |
| 3,051,180 | 8/1962 | Adams-Ray et al. | 128—402 |
| 3,062,941 | 11/1962 | White | 236—6 X |

FOREIGN PATENTS 258,308   9/1926   Great Britain.

EDWARD J. MICHAEL, *Primary Examiner.*